(12) United States Patent
Nishiyama et al.

(10) Patent No.: US 12,418,713 B2
(45) Date of Patent: Sep. 16, 2025

(54) MAIN OBJECT DETERMINATION APPARATUS, IMAGING APPARATUS, AND CONTROL METHOD FOR CONTROLLING MAIN OBJECT DETERMINATION APPARATUS

(71) Applicant: CANON KABUSHIKI KAISHA, Tokyo (JP)

(72) Inventors: Tomohiro Nishiyama, Tokyo (JP); Reiji Hasegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 18/172,598

(22) Filed: Feb. 22, 2023

(65) Prior Publication Data

US 2023/0276117 A1 Aug. 31, 2023

(30) Foreign Application Priority Data

Feb. 25, 2022 (JP) ................. 2022-028466

(51) Int. Cl.
*H04N 23/00* (2023.01)
*G06V 10/40* (2022.01)
(Continued)

(52) U.S. Cl.
CPC ........... *H04N 23/611* (2023.01); *G06V 10/40* (2022.01); *G06V 10/945* (2022.01); *G06V 40/10* (2022.01); *H04N 23/631* (2023.01)

(58) Field of Classification Search
CPC .... H04N 23/611; H04N 23/631; G06V 40/10; G06V 10/40; G06V 10/945
See application file for complete search history.

(56) References Cited

U.S. PATENT DOCUMENTS 10,055,853 B1 8/2018 Fisher
10,455,154 B2 10/2019 Kinoshita
(Continued)

FOREIGN PATENT DOCUMENTS

JP 2008085737 A 4/2008
JP 5987306 B2 9/2016
(Continued)

OTHER PUBLICATIONS

Yamamoto et al. "JP 2017016592A Translation". 2017 (Year: 2017).*
(Continued)

*Primary Examiner* — Zhihan Zhou
(74) *Attorney, Agent, or Firm* — Canon U.S.A., Inc. IP Division

(57) ABSTRACT

A main object determination apparatus includes an image acquisition unit configured to acquire images captured at different timings, a selection unit configured to select main object candidate(s) from objects in the images, a determination unit configured to determine whether the main object candidate(s) each selected at the respective different timings are the same, and an input unit configured to receive an operation. In a case where the determination unit determines that the main object candidate(s) selected by the selection unit in an image of interest and one or more images captured within a predetermined time before the image of interest is captured are the same, the determination unit determines the main object candidate(s) to be a main object. In a case where the input unit receives an instruction to specify a new main object, the determination unit switches the main object according to the instruction.

9 Claims, 7 Drawing Sheets

(51) Int. Cl.
*G06V 10/94* (2022.01)
*G06V 40/10* (2022.01)
*H04N 23/611* (2023.01)
*H04N 23/63* (2023.01)

(56) References Cited

U.S. PATENT DOCUMENTS

| | | | |
|---|---|---|---|
| 12,236,652 | B2 | 2/2025 | Datar |
| 2009/0059007 | A1 | 3/2009 | Wagg |
| 2013/0243323 | A1* | 9/2013 | Yaguchi ............... G06V 20/35 |
| | | | 382/173 |
| 2015/0070526 | A1* | 3/2015 | Kinoshita ............ H04N 23/80 |
| | | | 348/222.1 |
| 2015/0116517 | A1 | 4/2015 | Kinoshita |
| 2015/0296133 | A1 | 10/2015 | Kodama |
| 2016/0055651 | A1* | 2/2016 | Oami ..................... G06V 20/52 |
| | | | 348/143 |
| 2016/0334885 | A1* | 11/2016 | Togawa ................. G06F 30/00 |
| 2017/0255832 | A1* | 9/2017 | Jones ................... G06V 10/454 |
| 2018/0036590 | A1 | 2/2018 | Deangelis |
| 2018/0204070 | A1 | 7/2018 | Kawano |
| 2018/0241984 | A1 | 8/2018 | Sun |
| 2019/0057592 | A1 | 2/2019 | Kusens |
| 2019/0080495 | A1 | 3/2019 | Andronikos |
| 2019/0139229 | A1* | 5/2019 | Ohira ........................ G06T 7/11 |
| 2020/0245904 | A1* | 8/2020 | Ikeda ..................... A61B 5/1114 |
| 2021/0097291 | A1 | 4/2021 | Kosiakova |
| 2021/0127068 | A1 | 4/2021 | Nishiyama |
| 2021/0158537 | A1* | 5/2021 | Funamoto ............... G06T 7/246 |
| 2021/0192783 | A1 | 6/2021 | Huelsdunk |
| 2021/0203838 | A1* | 7/2021 | Tsuji ...................... H04N 23/67 |
| 2023/0124466 | A1 | 4/2023 | Shimauchi |
| 2023/0237835 | A1 | 7/2023 | Fu |
| 2024/0104765 | A1* | 3/2024 | Babazaki ............. G06V 10/762 |
| 2025/0006337 | A1 | 1/2025 | Oprea |

FOREIGN PATENT DOCUMENTS

| | | |
|---|---|---|
| JP | 2017016592 A | 1/2017 |
| JP | 2018066889 A | 4/2018 |
| JP | 2018538631 A | 12/2018 |
| JP | 2021071794 A | 5/2021 |
| JP | 2021082999 A | 5/2021 |
| WO | 2017084204 A1 | 5/2017 |

OTHER PUBLICATIONS

D. Hui, et al., Research on Sports Video Tracking Based on Clustering Extraction Algorithm, 2021 International Conference on Networking, Communications and Information Technology (NetCIT), Manchester, United Kingdom, 2021.

L. Yu, et al., Research of Image Main Objects Detection Algorithm Based on Deep Learning, 2018 IEEE 3rd International Conference on Image, Vision and Computing (ICIVC), Chongqing, China, 2018.

* cited by examiner

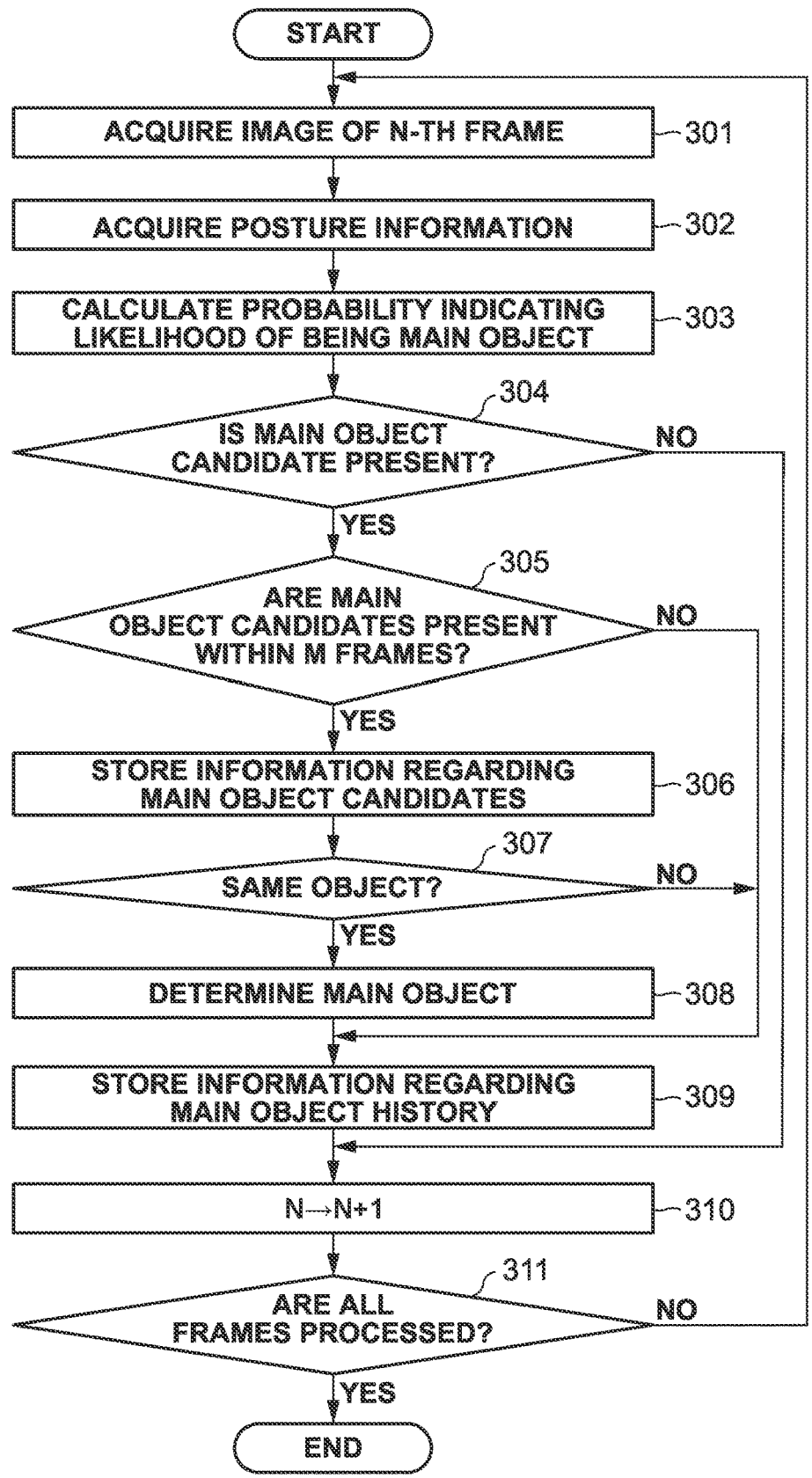

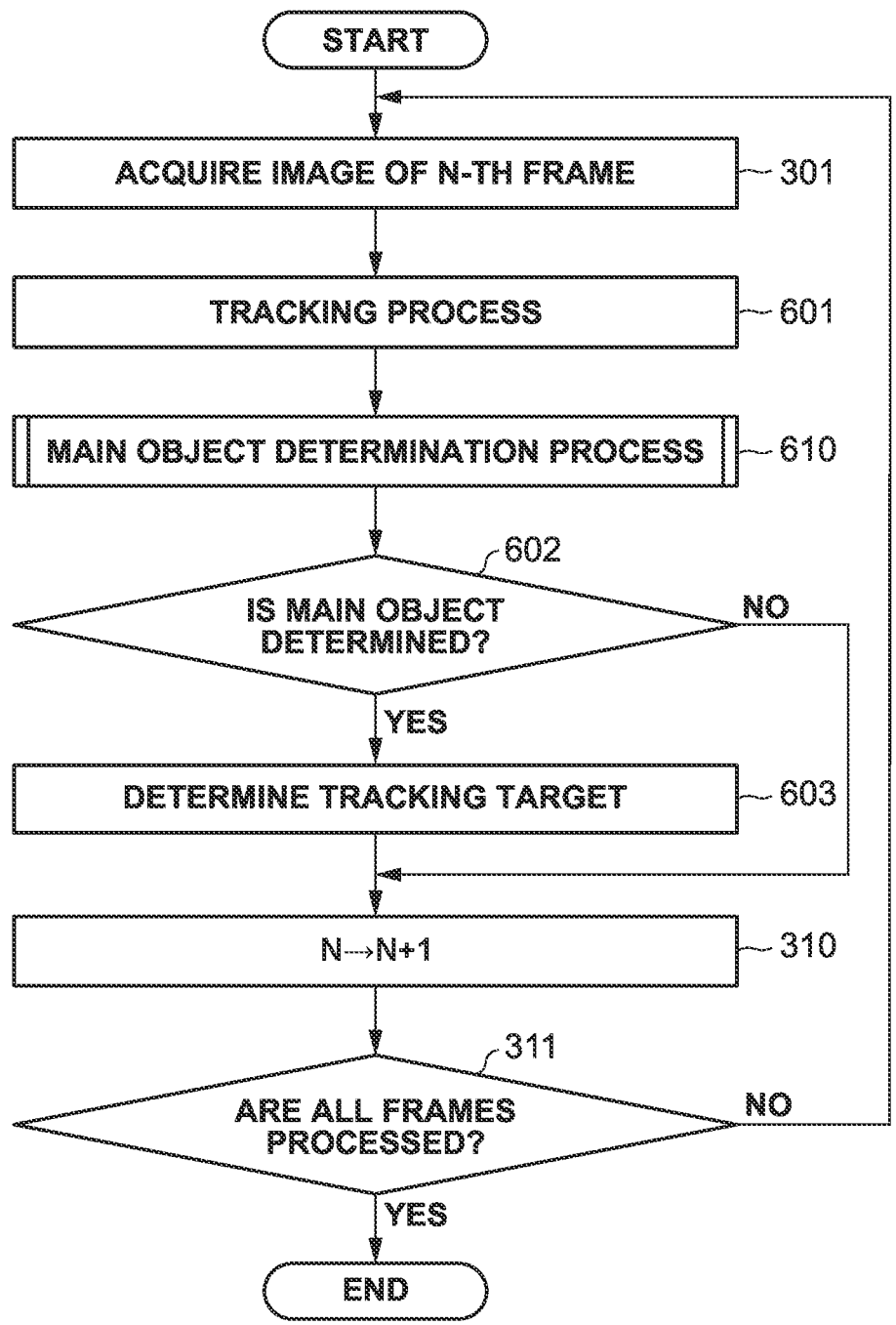

FIG. 7

|  | N-TH FRAME | (N-1)TH FRAME | (N-2)TH FRAME | (N-3)TH FRAME |
|---|---|---|---|---|
| CANDIDATE A | ○ | — | — | ○ |
| CANDIDATE B | — | ○ | — | — |

MAIN OBJECT DETERMINATION APPARATUS, IMAGING APPARATUS, AND CONTROL METHOD FOR CONTROLLING MAIN OBJECT DETERMINATION APPARATUS

BACKGROUND

Technical Field

The aspect of the present disclosure relates to a technique for estimating an object and determining a main object based on the result of the estimation.

Description of the Related Art

Conventionally, various techniques for detecting an object as a control target to perform imaging control, such as autofocus (AF) in an imaging apparatus, such as a digital camera, are discussed.

Japanese Unexamined Patent Application Publication No. 2018-538631 discusses, as an action recognition technique targeted at a plurality of people, a technique for simultaneously tracking a plurality of people and inputting time-series data to a recurrent neural network, thus simultaneously estimating the types of actions and the positions of the people.

In the publication of Japanese Unexamined Patent Application Publication No. 2018-538631, however, the simultaneous tracking of a plurality of objects and a recurrent neural network are required. Thus, the processing load is too high to provide the technique in hardware, such as an imaging apparatus.

There is a need in the art for, in an image where a plurality of objects is present, determining a main object that is likely to match the intention of a user with high accuracy while reducing the processing load.

SUMMARY

According to an aspect of the present disclosure, a main object determination apparatus includes an image acquisition unit configured to acquire images captured at different timings, a selection unit configured to select, using information regarding feature points of objects in the images, one or more main object candidates from the objects, a determination unit configured to determine, using information regarding feature amounts calculated from the feature points, whether the one or more main object candidates each selected at the respective different timings are the same, and an input unit configured to receive an operation from a user. In a case where the determination unit determines that the one or more main object candidates selected by the selection unit in an image of interest and one or more images captured within a predetermined time before the image of interest is captured are the same, the determination unit determines the one or more main object candidates to be a main object. In a case where the input unit receives an instruction to specify a new main object from the user, the determination unit switches the main object according to the instruction.

According to an another aspect of the present disclosure, a main object determination apparatus includes an image acquisition unit configured to acquire images captured at different timings, a selection unit configured to select one or more main object candidates from objects in the images, a determination unit configured to determine whether the one or more main object candidates each selected at the respective different timings are the same, and an input unit configured to receive an operation from a user. The selection unit selects the one or more main object candidates in one or more images captured within a predetermined time before an image of interest is captured, and in a case where the determination unit determines that the one or more main object candidates in the one or more images captured within the predetermined time are the same as a main object candidate in the image of interest, the determination unit determines the candidates to be a main object. In a case where the input unit receives an instruction to specify a new main object from the user, the determination unit switches the main object according to the instruction.

Further features of the present disclosure will become apparent from the following description of exemplary embodiments with reference to the attached drawings.

BRIEF DESCRIPTION OF THE DRAWINGS

FIG. 3 is a flowchart of a main object determination process according to the first exemplary embodiment.

FIG. 6 is a flowchart of a main object determination process according to a third exemplary embodiment.

FIG. 7 is examples of main object candidates according to a second exemplary embodiment.

DESCRIPTION OF THE EMBODIMENTS

With reference to the attached drawings, exemplary embodiments will be described in detail below. The following exemplary embodiments do not limit the present disclosure according to the appended claims. Although a plurality of features is described in the exemplary embodiments, not all the plurality of features is essential for the present disclosure, and the plurality of features may be optionally combined together. Further, in the attached drawings, the same or similar components are designated by the same reference numbers, and are not redundantly described.

<<Overall Configuration of Imaging Apparatus 100>>

Figure 1:
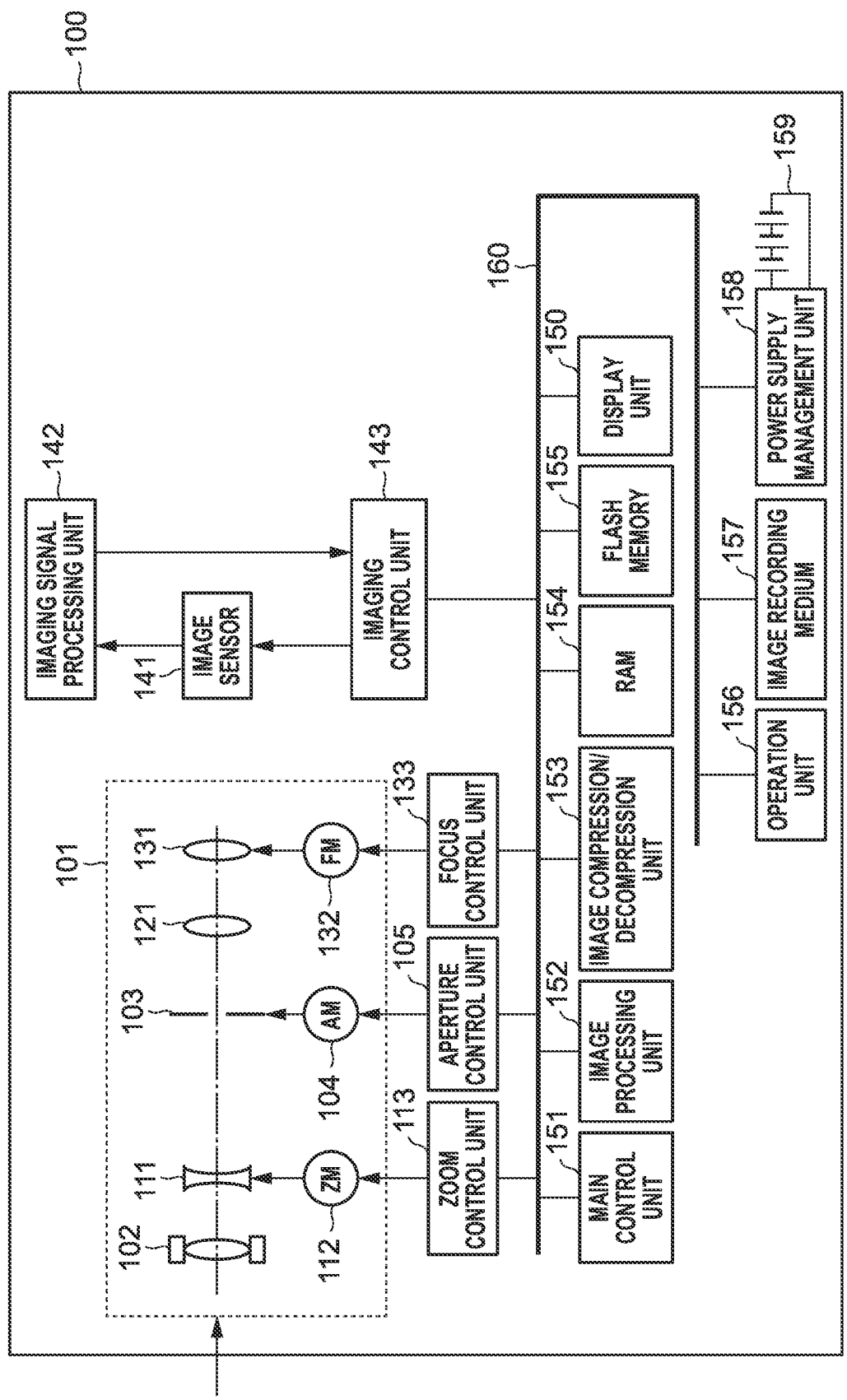
FIG. 1 is a block diagram illustrating a configuration of an imaging apparatus including a main object determination apparatus.

A first exemplary embodiment of the present disclosure will be described below. FIG. 1 is a block diagram illustrating the configuration of an imaging apparatus 100 including a main object determination apparatus. The imaging apparatus 100 is a digital still camera or a video camera that captures an object and records data as a moving image or a still image in various media, such as a tape, a solid-state memory, an optical disc, and a magnetic disk, but is not limited to these. The imaging apparatus 100 is applicable to any device having built-in or connected externally to an imaging apparatus, such as a mobile phone (a smartphone), a personal computer (a laptop computer, a desktop computer, or a tablet computer), a game apparatus, an in-vehicle sensor, a factory automation (FA) device, a drone, or a medical device. Thus, an "imaging apparatus" in the specification is intended to include any electronic device having an imaging function. A "main object determination apparatus" in the specification is intended to include any electronic device that determines a main object based on an image captured by an imaging apparatus.

A description will be provided below using as an example a case where an object is a person. A "main object" refers to an object serving as a target of imaging control intended by a user. The configuration illustrated in FIG. 1 is merely an example of the configuration of the imaging apparatus 100.

The units in the imaging apparatus 100 are connected together via a bus 160. The units are controlled by a main control unit 151.

A lens unit 101 of the imaging apparatus 100 is an imaging optical system including a first fixed lens group 102, a zoom lens 111, a diaphragm 103, a third fixed lens group 121, and a focus lens 131. According to an instruction from the main control unit 151, an aperture control unit 105 drives the diaphragm 103 via an aperture motor 104 (AM), thus adjusting the aperture diameter of the diaphragm 103 to adjust the amount of light when an image is captured.

A zoom control unit 113 drives the zoom lens 111 via a zoom motor 112 (ZM), thus changing the focal length. A focus control unit 133 determines a driving amount for driving a focus motor 132 (FM) based on the amount of shift in the focus direction of the lens unit 101. In addition, the focus control unit 133 drives the focus lens 131 via the focus motor 132 (FM), thus controlling the focus adjustment state. Autofocus (AF) control is realize by the focus control unit 133 and the focus motor 132 controlling the movement of the focus lens 131. The focus lens 131 is a lens for adjusting the focus and is illustrated in a simplified manner as a single lens in FIG. 1. Normally, however, the focus lens 131 includes a plurality of lenses.

An object image formed on an image sensor 141 through the lens unit 101 is converted into an electric signal by the image sensor 141. The image sensor 141 is a photoelectric conversion element that photoelectrically converts an object image (an optical image) into an electric signal. In the image sensor 141, light-receiving elements corresponding to m pixels are arranged in the horizontal direction, and light-receiving elements corresponding to n pixels are arranged in the vertical direction. An image formed on the image sensor 141 is photoelectrically converted, and the resulting image is processed as an image signal (image data) by an imaging signal processing unit 142. In this manner, an image on an imaging surface is obtained.

Image data output from the imaging signal processing unit 142 is sent to an imaging control unit 143 and temporarily accumulated in a random-access memory (RAM) 154. The image data accumulated in the RAM 154 is compressed by an image compression/decompression unit 153 and then is recorded in an image recording medium 157. In parallel with this process, the image data accumulated in the RAM 154 is sent to an image processing unit 152.

The image processing unit 152 applies image processing determined in advance to image data accumulated in the RAM 154. The image processing to be applied by the image processing unit 152 includes developing processes, such as a white balance adjustment process, a color interpolation (demosaic) process, and a gamma correction process, and also includes a signal format conversion process and a scaling process, but is not limited to these. In the present exemplary embodiment, the image processing unit 152 selects a main object candidate based on position information regarding posture information about the posture of an object (e.g., joint positions). The image processing unit 152 may use the result of the process of selecting the main object candidate in another type of image processing (e.g., the white balance adjustment process). The image processing unit 152 further determines whether main object candidates selected at different times are the same object. The image processing unit 152 saves the processed image data, posture information regarding each object, and position information regarding the center of gravity, the face, and the pupils of each main object candidate in the RAM 154. The image processing unit 152 also includes a tracking unit (not illustrated) and can perform a tracking process of tracking an object or a particular area between images, such as images during live view.

An operation unit (operation switch) 156 is an input interface including a button. The user performs selection operations on various function icons displayed on a display unit 150 and thus can perform various operations on the imaging apparatus 100, such as changing an image capturing mode and switching the method of an object determination process (to be described below).

The main control unit 151 includes one or more programmable processors, such as a central processing unit (CPU) and a microprocessor unit (MPU). For example, the main control unit 151 loads a program stored in a flash memory 155 into the RAM 154 and executes the program, thus controlling the components of the imaging apparatus 100 and implementing the function of the imaging apparatus 100. The main control unit 151 also executes an automatic exposure (AE) process of automatically determining exposure conditions (the shutter speed or the accumulation time, the stop value, and the sensitivity) based on information regarding object luminance. The information regarding the object luminance is obtainable from, for example, the image processing unit 152. The main control unit 151 can also determine the exposure conditions with reference to a particular object area, such as the face of a person.

The focus control unit 133 performs AF control at the position of a main object saved in the RAM 154. The aperture control unit 105 performs exposure control using the luminance value of a particular object area.

The display unit 150 displays an image and the result of detecting a main object. A battery 159 is appropriately managed by a power supply management unit 158 and stably supplies power to the entirety of the imaging apparatus 100.

The flash memory 155 stores a control program to be used for the operation of the imaging apparatus 100 and parameters to be used for the operations of the components. If the imaging apparatus 100 starts (shifts from a power-off state to a power-on state) by an operation of the user, the control program and the parameters stored in the flash memory 155 are loaded into a part of the RAM 154. The main control unit 151 controls the operation of the imaging apparatus 100 according to the control program and the constants loaded into the RAM 154.

<<Main Object Determination Process>>

Figure 2:
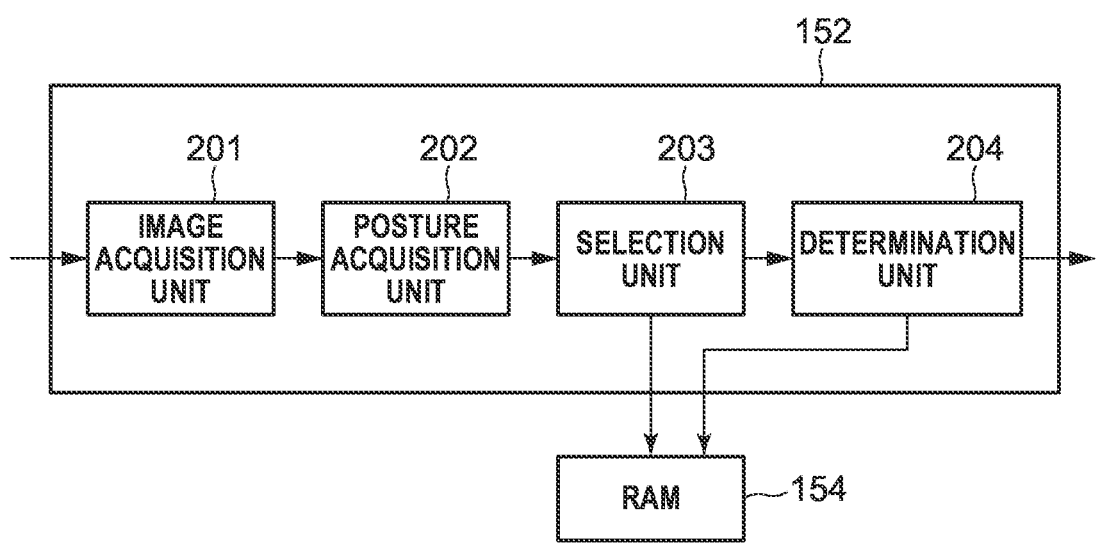
FIG. 2 is a block diagram illustrating a part of a detailed configuration of an image processing unit according to a first exemplary embodiment.

With reference to FIGS. 2 and 3, a main object determination process to be executed by the image processing unit 152 is now described. FIG. 2 is a block diagram illustrating a part of the detailed configuration of the image processing unit 152. FIG. 3 is a flowchart of the main object determination process. The processes of steps in this flowchart are implemented by the components of the image processing unit 152 operating under control of the main control unit 151, unless otherwise noted. Although the following description will be provided using a sport that is played by a plurality of people as a target image capturing scene of the main object determination process, an image capturing scene to which the present exemplary embodiment is applicable is not limited to this.

In step S301, an image acquisition unit 201 acquires an image captured in an N-th frame from the imaging control unit 143.

In step S302, a posture acquisition unit 202 detects object(s) (person or people) in the image acquired by the image acquisition unit 201, estimates the postures of the detected object(s), and acquires posture information. The posture information is acquired by acquiring "joint positions" (to be described below) from the detected object(s).

A trained model, such as a convolutional neural network (CNN) trained by machine learning, may be used as the methods of detecting objects and joint positions performed by the posture acquisition unit 202. In the detection of objects using a trained model, the posture acquisition unit 202 can detect objects using dictionary data for object detection that is generated by machine learning. To detect objects, pieces of dictionary data different between particular objects, such as dictionary data for "people" and dictionary data for "animals", may be used. The posture acquisition unit 202 detects objects by utilizing the pieces of dictionary data and changes the details of posture estimation to be subsequently performed based on which of the pieces of dictionary data is used to detect the objects. For example, if the detection of objects is completed using the dictionary data for "people", the posture acquisition unit 202 estimates the postures to correspond to "people".

If the detection of objects is completed by the posture acquisition unit 202, the posture acquisition unit 202 starts estimating the postures of the detected objects according to the types of the objects. As an example, a case will be described where the detected objects are people. Initially, the posture acquisition unit 202 acquires as feature points the positions of a plurality of joints of the people as the objects. Based on information regarding the acquired positions of the joints, the postures of the objects are estimated. As the method of estimating the postures, any method, such as a method utilizing deep learning, may be used.

As the method of detecting objects and the method of detecting joint positions that are performed by the posture acquisition unit 202, any trained model other than a trained CNN may be used. For example, a trained model generated by machine learning using a support vector machine or a decision tree may be applied to the posture acquisition unit 202. The posture acquisition unit 202 may not be a trained model generated by machine learning. For example, any object detection technique and any joint position detection technique without the use of machine learning may be applied to the posture acquisition unit 202.

In step S303, based on the posture information, a selection unit 203 calculates a probability indicating the likelihood of being a main object for each of the objects.

In step S304, the selection unit 203 determines whether an object to be a main object candidate is present. If an object to be a main object candidate is present (YES in step S304), the processing proceeds to step S305. The method of calculating the probability indicating the likelihood of being the main object and the specific method of selecting a main object candidate will be described below. If an object to be a main object candidate is not present (NO in step S304), the processing proceeds to step S310.

In step S305, a determination unit 204 references information in the RAM 154 and determines whether main object candidates are present in images in (N−M)th to (N−1)th frames captured at different timings from the Nth frame. If main object candidates are present (YES in step S305), the processing proceeds to step S306. If no main object candidates is present (NO in step S305), the processing proceeds to step S309. If N=1 (the first frame), there is no previous frame, so that the processing proceeds to step S309 after the process of step S305.

In step S306, the determination unit 204 stores information regarding the one or more main object candidates in the RAM 154, and the processing proceeds to step S307.

In step S307, the determination unit 204 performs matching between the main object candidates in images of some frames temporally close to the N-th frame, among the images in the (N−M)th to (N−1)th frames in which the main object candidates are detected, and the main object candidate(s) in the N-th frame, or the frame of interest, (such a matching is referred to as an identical object determination). As a result of the matching, if there is a main object candidate that has been determined to be the same object (YES in step S307), the processing proceeds to step S308. If not (NO in step S307), the processing proceeds to step S309.

It is desirable that M be adjusted so that if the frame rate is f [fps], M/f is an appropriate time for the image capturing scene or the objects. For example, in a case where an object to which attention is being paid in a sport scene, such as that of soccer, performs a shot action, the time from a preliminary action for the shot to the moment of the shot, which is a photo opportunity (such a time is referred to as a grace period) is generally about two or three seconds. Thus, it is desirable that the value of M be set so that the identical object determination is completed before the photo opportunity, and M/f only needs to be shorter than the grace period. The grace period to the photo opportunity differs depending on the image capturing scene or the objects. Thus, the determination unit 204 may be able to switch the value of M, where necessary. Alternatively, a configuration may be employed in which the value of M can be determined in advance by the user. Information regarding frames before the (N−M)th frame is not used in the process of step S307.

In step S308, the main object candidates determined to be the same object by the determination unit 204 is determined to be the main object. In step S309, the determined main object is stored as history information about a history of a main object in the RAM 154.

In step S310, the image processing unit 152 updates the N-th frame to an N+1-th frame. In step S311, the image processing unit 152 determines whether all the frames are processed. If not (NO in step S311), the processing returns to step S301.

<<Posture Acquisition Unit and Selection Unit>>

Figure 4A:
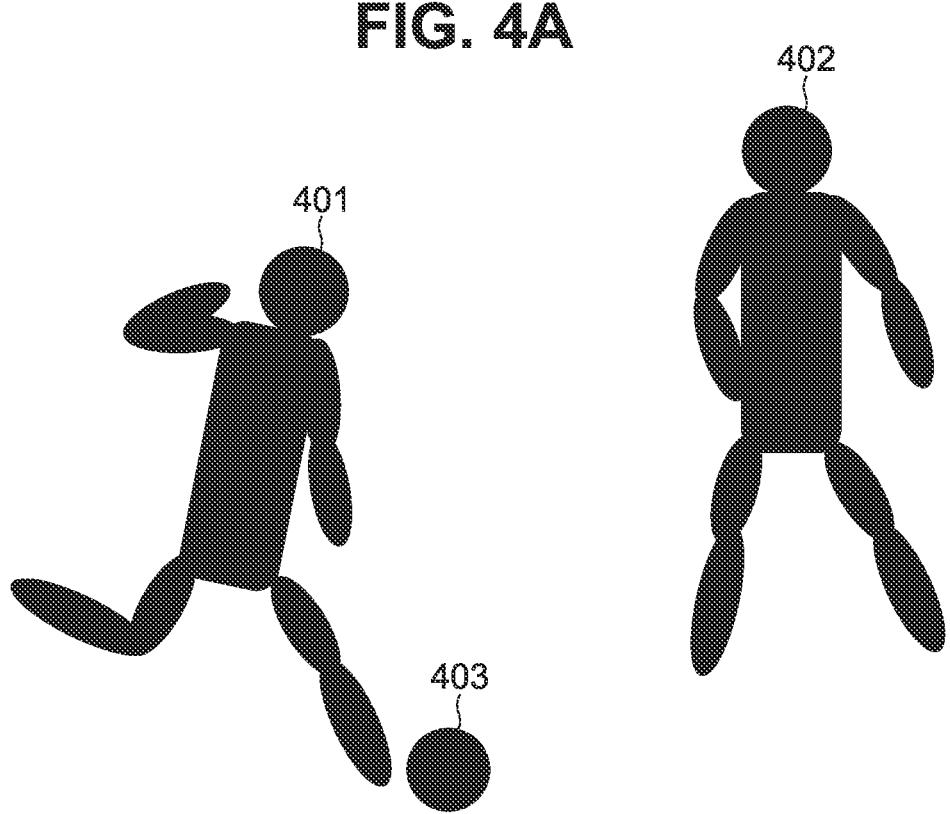
FIGS. 4A and 4B are each a conceptual diagram illustrating information acquired by a posture acquisition unit.
Figure 4B:
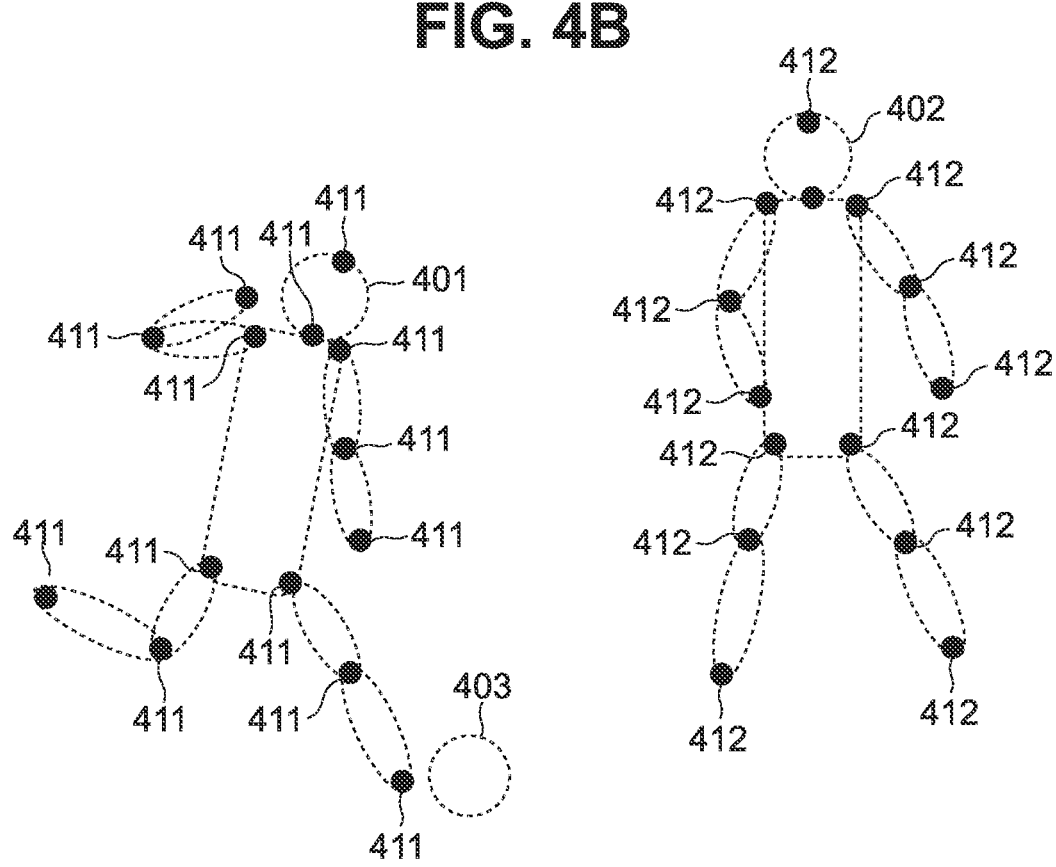

FIGS. 4A and 4B are conceptual diagrams illustrating information acquired by the posture acquisition unit 202. FIG. 4A illustrates a processing target image. An object 401 is about to kick a ball 403. The object 401 is an important object in the image capturing scene.

In the present exemplary embodiment, using posture information regarding objects acquired by the posture acquisition unit 202, the selection unit 203 determines an object (a main object) that the user is likely to intend it to be a target of imaging control or monitoring (a gaze). In contrast, an object 402 is a non-main object. The "non-main object" refers to an object other than the main object.

FIG. 4B is a diagram illustrating an example of posture information regarding the objects 401 and 402. Joints 411 represent joints of the object 401, and joints 412 represent joints of the object 402. While FIG. 4B illustrates an example where positions corresponding to the top of the head, the neck, the shoulders, the elbows, the wrists, the hips, the knees, and the ankles are acquired as joint (feature point) positions, the joint positions may be some of these positions, or other positions may be acquired. The postures may be estimated using not only information regarding the joint positions, but also information regarding axes connecting the joints.

A description will be provided below of a case where the joint positions are acquired as the posture information.

In step S302 in FIG. 3, the posture acquisition unit 202 acquires two-dimensional coordinates (x, y) of the joints 411 and 412 in the image. Here, the units of the coordinates (x, y) are pixels. The posture acquisition unit 202 estimates the postures of the objects 401 and 402 based on the acquired coordinate information regarding the joints 411 and 412. More specifically, the posture acquisition unit 202 grasps the positional relationships between the joint positions based on the acquired coordinate information regarding the joints 411 and 412 and acquires the posture information estimated from the positional relationships. In the estimation of the postures of an object, any trained model other than a trained CNN may be used. For example, a trained model generated by machine learning using a support vector machine or a decision tree may be applied to the posture acquisition unit 202. The posture acquisition unit 202 may not be a trained model generated by machine learning. For example, any posture estimation technique without the use of machine learning may be applied to the posture acquisition unit 202.

Referring back to FIG. 3, in step S303, the selection unit 203 calculates a reliability (a probability) indicating the likelihood of being a main object for each of the objects based on the coordinates of the joints 411 and 412 and the posture information which are acquired by the posture acquisition unit 202. As the method for calculating the probability, a machine learning technique, such as a neural network, a support vector machine, and a decision tree, can be used. The method is not limited to machine learning, and a function that outputs the reliability or the probability value may be constructed based on a certain model. A weight or a bias value obtained through learning may be saved in advance in the flash memory 155 and stored in the RAM 154, where necessary.

The selection unit 203 may calculate the reliability using data obtained by performing a predetermined transformation, such as a linear transformation, on the coordinate data of the joints acquired by the posture acquisition unit 202. In this case, the posture acquisition unit 202 or the selection unit 203 may perform the predetermined transformation on the coordinate data on the joints.

In the present exemplary embodiment, a case will be described where the probability that the object will be the main object in the processing target image is employed as the reliability indicating the likelihood of being the main object (the reliability corresponding to the degree of possibility that the object will be the main object in the processing target image). Alternatively, a value other than the probability may be used. For example, the multiplicative inverse of the distance between the position of the center of gravity of the object and the position of the center of gravity of an important physical body in a scene, such as a ball, can be used as the reliability. For example, an object to which the user is paying attention in a scene where a shot is made in soccer (a person who makes a shot) is expected to be close to a soccer ball as an important physical body. Thus, the multiplicative inverse can be utilized to calculate the reliability.

In step S304, the selection unit 203 selects the object having the greatest probability among the detected objects (people) as a main object candidate. In step S306, the selection unit 203 stores the coordinates of the joints of the main object candidate and representative coordinates (the position of the center of gravity or the position of the face) indicating the main object candidate in the RAM 154. This completes the selection process. The process of step S304 may be performed by the determination unit 204.

In the above description, a case has been described where the main object candidate is selected using the posture information in a single frame. In another embodiment, a configuration may be employed in which successive frames or a moving image is read, the probability is calculated using time-series posture information, and the main object is determined. In a case where the time-series posture information is used, information regarding the joint positions (the feature points) at each time may be used, or information regarding motion vectors (feature amounts calculated from the feature points) of the joints or the objects and information regarding the joint positions at a certain time may be used in combination. In addition, any information indicating time-series information can be used.

To train the selection unit 203 in the calculation of the reliability (the probability), the selection unit 203 can learn the state before transition to an important behavior, such as a behavior related to an event to be recorded, detected, or monitored, (such a state is referred to as a state of a preparation action) as the state of the main object.

For example, for a scene of kicking up a ball the selection unit 203 can learn the state in which a person kicks leg up to kick a ball, as one of the states of the main object. The reason for employing this configuration is that when an object that is to be a main object performs an important behavior, the object is to be appropriately determined to be the main object and the imaging apparatus 100 is to be controlled to correspond the main object. In a case where the reliability (the probability value) corresponding to the main object exceeds a threshold set in advance, control for automatically recording an image or a video (recording control) is started, so that the user can also capture an image without missing an important moment (a photo opportunity). At this time, information regarding a typical time from the state of the learning target to the important behavior (a grace period to the photo opportunity) may be used to control the imaging apparatus 100. In other words, the imaging apparatus 100 may be controlled so that if the main control unit 151 detects an important behavior of an object, AF and exposure are completed after a typical time corresponding to the detected important behavior, and a main image capturing operation is performed (the shutter is released).

<<Determination Unit>>

Figure 5A:
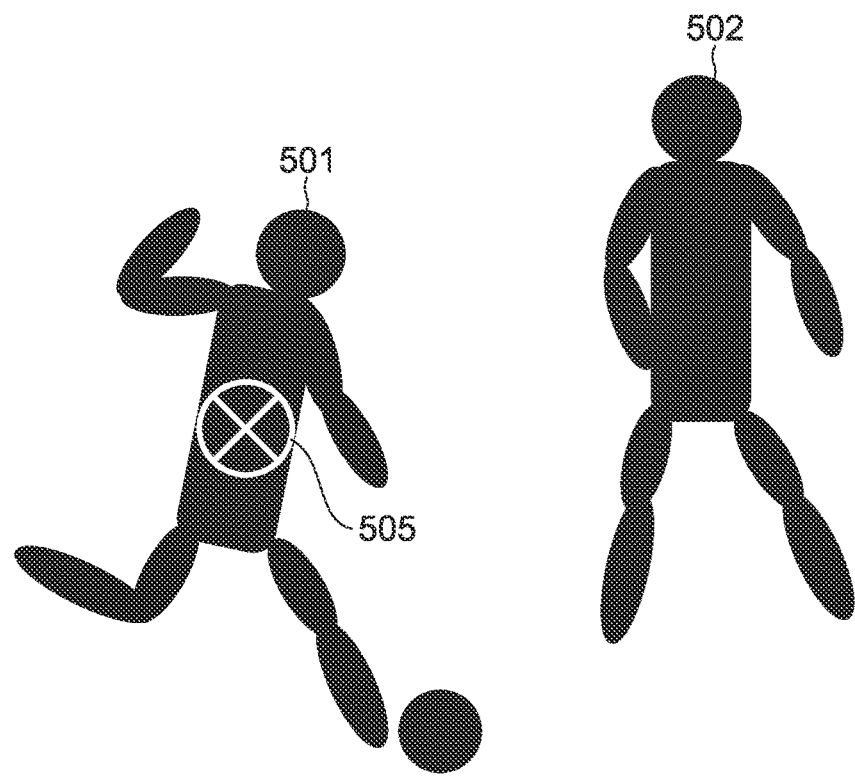
FIGS. 5A and 5B are examples of processing target images in different frames.
Figure 5B:
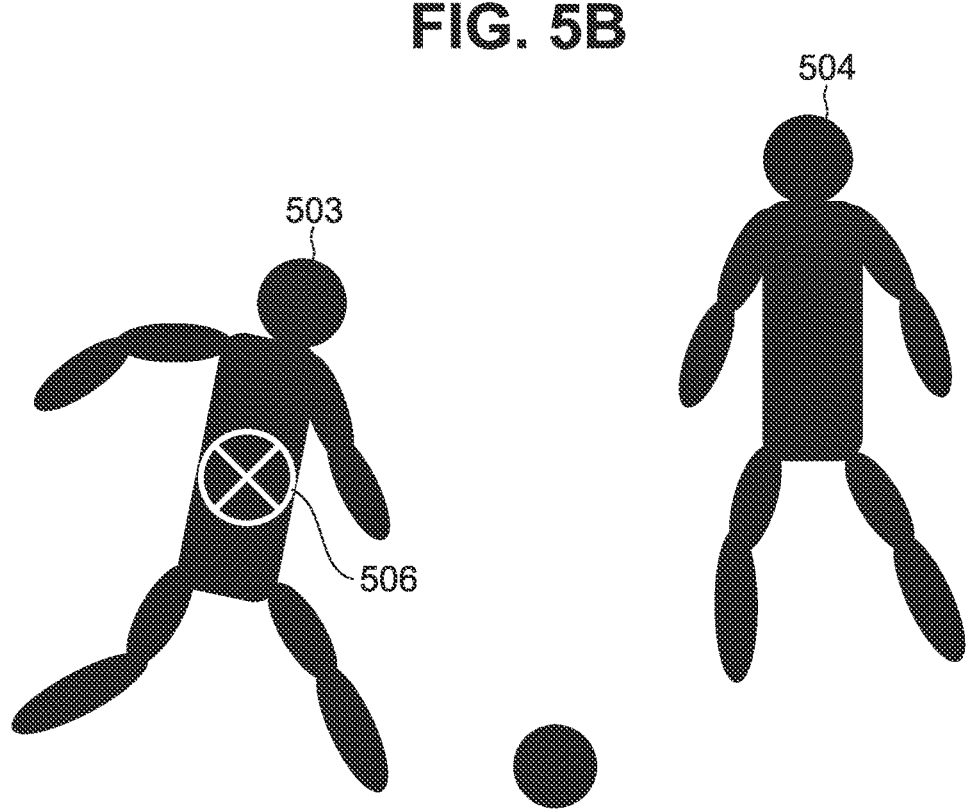

FIGS. 5A and 5B are examples of processing target images in different frames. FIG. 5A illustrates an image (an image of interest) in a frame (a frame of interest) to which attention is paid. FIG. 5B illustrates an image M frames before the frame of interest. If the selection unit 203 selects objects 501 and 503, the determination unit 204 calculates the distance between the position of the center of gravity 505 of the object 501 and the position of the center of gravity 506 of the object 503. If the distance is less than a threshold determined in advance, the determination unit 204 regards the objects 501 and 503 as the same object. This is because when f is the frame rate [fps], and if a time M/f [sec], which is a time for M frames, is sufficiently short, the distance by which an object moves during the time M/f is expected to be limited. In FIGS. 5A and 5B, each of the positions of the centers of gravity 505 and 506 is indicated by a figure obtained by combining a circle and intersecting line segments (the intersection position of the line segments is regarded as the gravity point) for ease of understanding. The actual position of the center of gravity is calculated as a coordinate point or area that can be calculated from the positions of the joints in the above two-dimensional coordinate system.

In another embodiment, other techniques by which an identical object determination is enabled, such as template matching using the color or the luminance histogram of an image and matching using information regarding parts of joints, are applicable. In general, occlusion is less likely to occur for an object for which posture information is detected. Thus, it is possible to achieve high matching accuracy using a simple technique.

As described above, according to the first exemplary embodiment, the imaging apparatus 100 acquires posture information for each of a plurality of objects detected from a processing target image(s) and selects a main object candidate from among the plurality of objects based on the posture information for each of the plurality of objects. The imaging apparatus 100 makes an identical object determination between main object candidates detected in frames within a predetermined time, thus determining a main object.

This enables determination of a main object that is likely to match the intention of the user in an image where a plurality of objects is present.

It is also possible to reduce the processing load by performing matching only once in the main object determination process. In addition, it is possible to further improve the accuracy of detecting a main object by making an identical object determination using information regarding two or more frames in the main object determination process.

<<Display Unit>>

A description will be provided of an image and the result of detecting a main object displayed on the display unit 150.

After the main object determination process described above is performed based on an instruction from the main control unit 151, the display unit 150 may display an image with a marker or a frame superimposed on the determined main object. The superimposed display of a marker or a frame may be performed not only on the main object, but also on the main object candidates or a tracking target object. In such a case, the markers or the frames may be displayed with different colors, thickness, and/or shapes thereof so that the main object candidates, the determined main object, and the tracking target object can be distinguished from each other.

For example, a thick line frame may be displayed superimposed on the main object, and a thin line frame may be displayed superimposed on each of the main object candidates. The manner of the display is not limited to this example, and any display can be performed so long as the user can distinguish the main object and the main object candidates. To prevent the display from being intricate, a marker may be displayed only on an object corresponding to the main object. If the main object and the tracking target object are the same, either one of the markers indicating the main object and the tracking target object may be superimposed.

The display of the markers or the frames does not necessarily need to be performed after the completion of the main object determination process, and may be started from the time when the main object candidates are detected in the image. In contrast, if the main object candidates, the main object, and the tracking target object are not present in the image, the superimposed display may not be performed. The user may be allowed to turn on and off the superimposed display, where necessary.

<<Tracking Unit>>

The tracking unit of the image processing unit 152 will now be described.

Using the result of the detection of an object, the tracking unit identifies an image area (an object area) to be tracked. For example, the tracking unit extracts feature amounts from an object area of an image in a certain reference frame, and using the extracted feature amounts, searches sequentially supplied individual images for an area having a high degree of similarity to the object area in the reference frame as an object area. The reference frame may be replaced with a chronologically new frame at any timing. In such a case, feature amounts extracted from an object area found in the new reference frame are to be used for tracking in the next and subsequent frames.

As the method for searching for the area based on the feature amounts of the image, template matching, histogram matching, and a Kanade-Lucas-Tomasi (KLT) feature tracker method can be used. Other techniques by which the object area is searchable based on the feature amounts may be used. In addition to the above techniques, a CNN for object tracking may be trained, images in different frames may be input to the CNN, and an image area to be tracked may be output from the CNN.

The tracking unit of the image processing unit 152 performs a tracking process in the image acquired by the image acquisition unit 201 based on an instruction from the main control unit 151. An image area to be tracked may be specified by utilizing information regarding the object detected by the posture acquisition unit 202. Alternatively, the tracking unit may detect an object area. If the tracking is started, the tracking unit stores information regarding the object that is being tracked as information regarding a tracking target object history in the RAM 154 with respect to each of the sequentially supplied images (frames).

As the method of determining an object to be tracked, the user may set in advance an object to be preferentially tracked. For example, the user can set the mode of an object to be preferentially tracked using the display unit 150. Alternatively, the result of the main object determination may be used. For example, it is possible to make a setting to track an object having been determined to be a main object.

A second exemplary embodiment of the present disclosure will be described below. In the present exemplary embodiment, a variation of the main object determination process according to the first exemplary embodiment will be described.

In the second exemplary embodiment, the basic configuration of the imaging apparatus 100 is similar to that according to the first exemplary embodiment (see FIG. 1). The differences from the first exemplary embodiment are mainly described below.

In step S307 in FIG. 3, the determination unit 204 performs matching between all the main object candidates in not only the frame closest to the N-th frame, but also in all the (N−M)th to (N−1)th frames recorded in the RAM 154. If there is a main object candidate that has been determined to be the same object (YES in step S307), the processing proceeds to step S308. If not (NO in step S307), the processing proceeds to step S309.

Thus, matching is performed between the main object candidates in all the past M frames, so that even if a candidate B is detected during the detection of a candidate A as illustrated in FIG. 7, it is possible to determine the candidate A to be the same object.

As described above, according to the second exemplary embodiment, even if different people are detected as main object candidates, a main object candidate in a past frame is less likely to be overlooked. Thus, it is possible to further improve the accuracy of detecting a main object.

A third exemplary embodiment of the present disclosure will be described below. In the third exemplary embodiment, a case will be described where the main object determination process and the object tracking process according to each of the first and second exemplary embodiments are simultaneously performed.

In the third exemplary embodiment, the basic configuration of the imaging apparatus 100 is similar to those according to the first and second exemplary embodiments (see FIG. 1). The differences from the first exemplary embodiment are mainly described below.

FIG. 6 is a flowchart illustrating processing according to the present exemplary embodiment. In step S601, the posture acquisition unit 202 detects in the N-th frame the same object as an object (a tracking target object) that has been tracked up to the (N−1)th frame by the tracking unit of the image processing unit 152.

The operation in step S610 represents the operations in steps S303 to S309 in FIG. 3 and is the main object determination process described in the first exemplary embodiment. In step S602, it is determined whether a main object is determined in step S610. If a main object is determined (YES in step S602), then in step S603, the tracking target object is changed to the main object determined in step S610. If the main object determined in step S610 and the tracking target object are the same, the tracking target object is not changed.

As described above, according to the third exemplary embodiment, even during the use of the tracking process, it is possible to determine a main object that is likely to match the intention of the user among a plurality of objects, and further track the object.

In the present exemplary embodiment, an example has been illustrated where the image sensor 141 of the imaging apparatus 100 is fixed to the main body of the imaging apparatus 100 and tracks an object in the same angle of view. This configuration is however not restrictive in the respective exemplary embodiments, and a configuration may be employed in which the imaging apparatus 100 has a pan-tilt-zoom driving mechanism and tracks an object while performing at least any of pan, tilt, and zoom according to the motion of the object.

A fourth exemplary embodiment of the present disclosure will be described below. In the fourth exemplary embodiment, a variation of the main object determination process according to each of the first to third exemplary embodiments will be described.

In the fourth exemplary embodiment, the basic configuration of the imaging apparatus 100 is similar to those according to the first to third exemplary embodiments (see FIG. 1). The differences from the first exemplary embodiment are mainly described below.

When the determination unit 204 determines the main object in step S308, the main object may switch to an object different from the main object determined in the immediately preceding frame. If the object determined to be the new main object is different from an object intended by the user, it is desirable to cancel the selection of the main object and reset the main object. Thus, in the present exemplary embodiment, the user can cancel the selection of the main object and reset the main object by performing a predetermined operation using the operation switch 156 (including a touch panel and a gesture detector).

The method of cancelling the selection of the main object and redetermining the main object is as follows. If the user performs the predetermined operation using the operation switch 156, the image processing unit 152 references a main object history saved in the RAM 154 in step S309. The main object history to be referenced may be a main object history immediately before the predetermined operation is performed (the N-th frame) or in a recent frame, or all main object histories recorded in (N−L)th to (N−1)th frames. L is a number determined independently of M described above.

The determination unit 204 performs matching between all main object candidates in the main object history in a frame before the main object switches in the referenced main object history and in the current frame of interest. As a result of the matching, if the determination unit 204 determines that any of the main object candidates is the same object as the main object in the main object history, the determination unit 204 newly determines the main object candidate in the frame of interest as the main object. Thus, even in a situation where the main object is switched, a previous main object history is referenced, and an identical object determination is made, so that it is possible to cancel the selection of the main object and redetermine the main object.

The cancellation of the selection of the main object and the resetting of the main object can also be performed by utilizing a tracking target object history. If the user performs the predetermined operation using the operation switch 156, the image processing unit 152 references a tracking target object history saved in the RAM 154. It is desirable that the tracking target object history to be referenced be a tracking target object history immediately before the predetermined operation is performed or in a recent frame. This is because the object tracked before the main object switches is likely to be an object that the user intends to capture.

The determination unit 204 performs matching between the tracking target object history in a frame before the main object switches and main object candidates in the current frame of interest. As a result of the matching, if the determination unit 204 determines that any of the main object candidates is the same object as the tracking target object in the tracking target object history, the determination unit 204 newly determines the main object candidate in the frame of interest to be the main object. The tracking unit determines the object to be a tracking target. Thus, even in a situation where the main object is switched, a previous tracking target object history is referenced, and an identical object determination is made, so that it is possible to cancel the selection of the main object and redetermine the main object.

A configuration may be employed in which either of the cancellation of the selection of the main object and the redetermination of the main object using the main object history and the cancellation of the selection of the main object and the redetermination of the main object using the tracking target object history, as described above, is performed. Alternatively, a configuration may be employed in which the main object is determined using both the main object history and the tracking target object history, and the image processing unit 152 evaluates which of the determinations has a higher reliability, thus determining the main object.

The method of cancelling the selection of the main object is as follows. If the user performs the predetermined operation using the operation switch 156, the determination unit 204 may not perform the main object determination process on an image captured at the time when the predetermined operation is performed, and may perform the process on an image captured next. Alternatively, a configuration may be employed in which, if the user performs the predetermined operation, all main object histories and tracking target object histories previously recorded in the RAM 154 are erased, and the determination of a main object is newly started. In such a case, it is possible to reduce the influence of the histories of main objects and tracking target objects in the past.

The predetermined operation on the operation switch 156 may be performed by the user touching and selecting (specifying) an intended object on the touch panel (provided next to the display unit 150) while checking the display unit 150. In such a case, the process of redetermining the main object as described above may be performed on the touched object. If the touched object is not included in a main object history, the determination unit 204 may determine the object to be the main object. Thus, it is possible to immediately select a main object candidate that newly appears as the main object.

In the image capturing scene assumed in the present exemplary embodiment, the time of transition from a preparation action of a main object candidate to the moment of a photo opportunity is expected to be short. That is, there is not necessarily sufficient allowance for the user to select an object by a touch. In such a case, the following configuration may be employed. The operation switch 156 is separately provided as a button for redetermining the main object. Thus, the user is enabled to quickly provide an instruction to cancel the selection of the main object candidate and redetermine the main object candidate by operating the redetermination button. The predetermined operation in this case refers to an operation on the redetermination button. Alternatively, the predetermined operation may cooperate with an operation on a shutter button (not illustrated) of the imaging apparatus 100. For example, if the user separates their finger from the shutter button in a half press state (an image capturing preparation state), the cancellation of the selection of the main object and the redetermination of the main object may be executed.

If the redetermination and/or the selection is performed, the main control unit 151 may perform control so that the marker or the frame displayed superimposed on the main object on the display unit 150 switches to another object.

In some cases, an object intended to be the main object by the user may not be detected at the time when the user performs the predetermined operation. Examples of such a case include a case where the object moves out of the screen, and a case where the object is hidden behind another object or an obstacle. In such a case, the main object determined in a frame at the time when the user performs the predetermined operation is held, and the processing proceeds to the next frame. In this case, the superimposed display on the main object on the display unit 150 is held in the main object determined in the frame at the time when the predetermined operation is performed.

As described above, according to the fourth exemplary embodiment, when a main object different from the intention of the user is determined, it is possible to cancel the main object and reset the main object by an operation of the user.

A fifth exemplary embodiment of the present disclosure will be described below. In the fifth exemplary embodiment, a variation of the main object determination process according to each of the first to fourth exemplary embodiments is described. In the present exemplary embodiment, the main object determination process is performed by combining the evaluation of the value of the probability indicating the likelihood of being the main object and matching between a plurality of frames, for a plurality of objects. Thus, in a case where a plurality of objects each likely to be a main object is present as in a competition in a sport, it is possible to prevent a main object candidate from being overlooked and improve the accuracy of determining the main object.

In the fifth exemplary embodiment, the basic configuration of the imaging apparatus 100 is similar to that according to the first exemplary embodiment (see FIG. 1). A description is provided below mainly according to the first exemplary embodiment.

In the present exemplary embodiment, in steps S301 to S303 in FIG. 3, processes similar to those in the first exemplary embodiment are performed.

In step S304, the selection unit 203 selects the object having the greatest value of the probability indicating the likelihood of being the main object and also an object in which the difference from the greatest value of the probability has a value smaller than a value determined in advance as a main object candidate.

In step S305, the determination unit 204 references information in the RAM 154 and determines whether main object candidates are present in images in (N−M)th to (N−1)th frames. If main object candidates are present (YES in step S305), the processing proceeds to step S306. If main object candidates are not present (NO in step S305), the processing proceeds to step S309. Also in step S306, a process similar to that in the first exemplary embodiment is performed.

In step S307, the determination unit 204 performs matching on all the main object candidates recorded in the RAM 154 and the main object candidates in the images in the (N−M)th to (N−1)th frames. If it is determined that one of the main object candidates recorded in the RAM 154 and one of the main object candidates in the images in the (N−M)th to (N−1)th frames are the same object (YES in step S307), the processing proceeds to step S308. If not (NO in step S307), the processing proceeds to step S309. In the first to third exemplary embodiments, the identical object determination is made in step S307 on condition that the same object can be obtained from the frame of interest and a single frame other than the frame of interest. Alternatively, the condition may be that main object candidates can be matched between the frame of interest and two or more frames other than the frame of interest. The technique for storing a plurality of main object candidates and the technique for tightening the condition for the identical object determination may be simultaneously performed, or either one of the techniques may be performed. The condition for the identical object determination is tightened, thus preventing a decrease in the accuracy of the identical object determination even with many main object candidates.

As described above, according to the fifth exemplary embodiment, in a case where a plurality of objects likely to be a main object is present in a screen, it is possible to prevent a main object candidate from being overlooked and improve the accuracy of selecting an object.

OTHER EXEMPLARY EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, in an image where a plurality of objects is present, it is possible to determine a main object that is likely to match the intention of a user with high accuracy.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-028466, filed Feb. 25, 2022, which is hereby incorporated by reference herein in its entirety.

What is claimed is:

1. A main object determination apparatus comprising:
   one or more processors; and
   a memory storing instructions which, when executed by the one or more processors, cause the main object determination apparatus to function as:
   an object detection unit configured to detect persons from a first image captured;
   a calculation unit configured to, when the persons are detected by the object detection unit, for each of the detected persons, acquire posture information about the person, the posture information being estimated from positional relationships between joints, and, based on the posture information, calculate a reliability corresponding to a probability of a main object in the first image;
   a determination unit configured to, based on the reliability, determine whether or not a main object candidate in the first image exists;
   a decision unit configured to, in a case where the determination unit determines that the main object candidate in the first image exists, determine whether or not the main object candidate in the first image is identical to a main object candidate in a plurality of images that were captured within predetermined frames before the first image, and configured to, in a case of determining as being identical in images of a determined number of frames or more, the determined number having been determined in advance, decide the main object candidate as the main object, and configured to, in a case where the determination unit determines that the main object candidate in the first image does not exist, does not perform the determination as to whether identical or not; and
   a switching unit configured to, upon receiving an instruction from a user for designating a main object anew, perform main object switching.

2. The main object determination apparatus according to claim 1, wherein the calculation unit calculates the reliability corresponding to a degree of possibility of being the main object from each of the objects.

3. The main object determination apparatus according to claim 2, wherein the calculation unit calculates the reliability using a distance between the respective objects and an important physical body.

4. The main object determination apparatus according to claim 2, wherein the calculation unit selects an object of which the reliability has the greatest value as the main object candidate.

5. The main object determination apparatus according to claim 4, wherein the calculation unit selects also an object in which a difference from the greatest value of the reliability has a value smaller than a value determined in advance as the main object candidate.

6. The main object determination apparatus according to claim 1, wherein the calculation unit does not perform selection of the one or more main object candidates from an image that is not captured within the predetermined time before an image of interest is captured.

7. An imaging apparatus comprising:
   an imaging unit configured to capture an object image formed through an imaging optical system; and
   the main object determination apparatus according to claim 1.

8. A control method for controlling a main object determination apparatus, the control method comprising:
   detecting persons from a first image captured;
   acquiring, when the persons are detected, for each of the detected persons, posture information about the person, the posture information being estimated from positional relationships between joints, and, based on the posture information, calculating a reliability corresponding to a probability of a main object in the first image;
   determining, based on the reliability, whether or not a main object candidate in the first image exists;
   determining, in a case where it is determined that the main object candidate in the first image exists, whether or not the main object candidate in the first image is identical to a main object candidate in a plurality of images that were captured within predetermined frames before the first image, and deciding, in a case of determining as being identical in images of a determined number of frames or more, the determined number having been determined in advance, the main object candidate as the main object, and not performing, in a case where it is determined that the main object candidate in the first image does not exist, the determination as to whether identical or not; and
   performing, upon receiving an instruction from a user for designating a main object anew, main object switching.

9. A non-transitory computer-readable storage medium storing a program for causing a computer to perform the control method according to claim 8.

* * * * *